Jan. 15, 1924.
W. H. SAWYER
MOTOR VEHICLE SIGNAL APPARATUS
Filed April 14, 1922
1,480,783
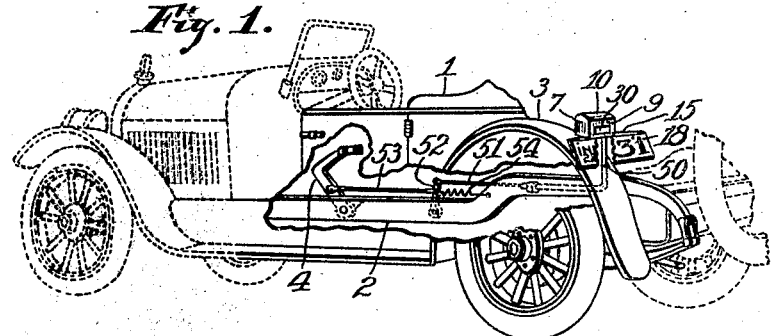
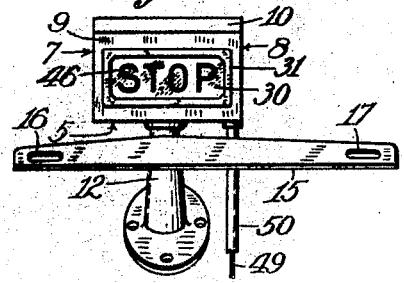
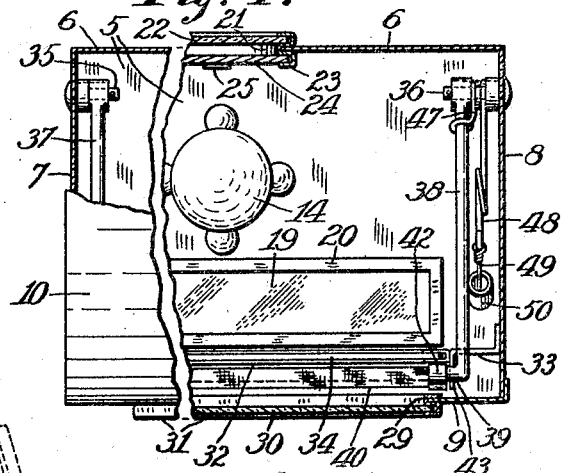
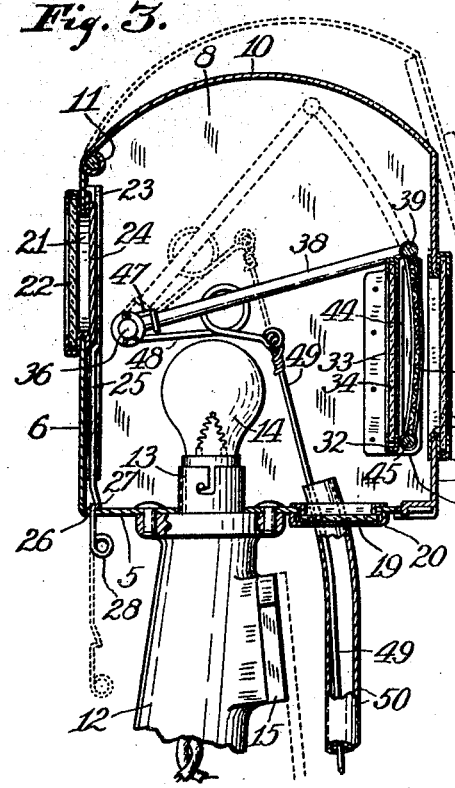
INVENTOR:
William H. Sawyer,
BY
E. T. Silvius,
ATTORNEY.

Patented Jan. 15, 1924.

1,480,783

UNITED STATES PATENT OFFICE.

WILLIAM HUBERT SAWYER, OF MONROE TOWNSHIP, MORGAN COUNTY, INDIANA.

MOTOR-VEHICLE SIGNAL APPARATUS.

Application filed April 14, 1922. Serial No. 552,451.

*To all whom it may concern:*

Be it known that I, WILLIAM H. SAWYER, a citizen of the United States, residing in Monroe Township, in the county of Morgan and State of Indiana, have invented a new and useful Motor-Vehicle Signal Apparatus, of which the following is a specification, reference being had to the accompanying drawings and to the letters and figures of reference marked thereon.

This invention relates to apparatus designed more particularly for use on the rearward portion of motor vehicles whereby to display signals indicating intended movements or stopping of the motor vehicles, the invention having reference more particularly to a danger signal designed to be operated automatically when the operator applies the brakes to stop the motor vehicle, for the purpose of indicating the intention to those who may be following.

An object of the invention is to provide a motor vehicle signal apparatus that shall be simple and not costly to manufacture, and be reliable in displaying signals without requiring the attention or manipulation of the operator of the motor vehicle, the aim being to as far as possible to avoid accidents and damage to vehicles and injury to their occupants that may result from collisions.

Another object is to provide a signal apparatus which shall be so constructed as to be enabled to ordinarily operate as a rear end signal at night as a "tail light" to indicate the position of the motor vehicle, and which shall be provided with an automatic stop signal to warn those following that the motor vehicle is about to stop.

A further object is to provide an improved signal apparatus for motor vehicles which shall combine in its structure a signal indicating to those ahead that the motor vehicle has stopped or is "parked" and which shall advantageously combine therewith the usual "tail light" and also a stop signal, all compactly combined and having means for carrying the required license number plate, to be illuminated at night time.

With the above-mentioned and other objects in view, the invention consists in a signal apparatus for motor vehicles having various novel features, and in improved signal structure; and, the invention consists also in the parts and combinations and arrangements of parts as hereinafter particularly described and further defined in the accompanying claims.

Referring to the drawings,—Figure 1 is a fragmentary perspective view of an automobile, shown partly by broken lines, to which the invention in one of its advantageous arrangements is applied; Fig. 2 is a rear elevation of the principal portion of the signal structure; Fig. 3 is a vertical sectional elevation of the principal portion of the signal apparatus on an enlarged scale; Fig. 4 is a horizontal section of Fig. 3, partially broken away, and Fig. 5 is a face view of the stop signal device.

Similar reference characters in the various figures of the drawings indicate corresponding elements or features of construction herein referred to in detail.

A familiar type of automobile comprises a body 1, frame bars 2, rear fenders or mud guards 3, and a foot lever 4 for operating the service brake and with which the vehicle is invariably provided.

The principal structure of the apparatus includes an enclosing case which comprises a bottom 5, a front wall 6, side walls 7 and 8, and a rear wall 9 which is preferably fixed to a top 10 that is connected to the front wall 6 by means of a hinge 11 and normally rests upon the side walls, the rear wall 9 standing against the edges of the side walls. The bottom of the rear wall 9 is suitably latched to the bottom 5. The case, however, may be variously constructed so as to have a door permitting access to the interior of the case. A suitable standard 12 is provided which is suitably mounted on an automobile, being preferably secured to the fender or guard 3, and it is secured to the bottom 5 of the case and has a lamp socket 13 on its top that projects into the case and supports an electric lamp 14. The rearward portion of the standard has a cross-bar 15 fixed thereto which has slots 16 and 17 adjacent to the ends thereof to receive bolts whereby to secure a license number plate 18 thereto. The bottom 5 has a window therein rearward of the socket 13 through which light from the lamp may pass to the license number plate, the window preferably having a transparent plate 19 therein to exclude dust from the case, the plate preferably having a frame 20.

The upper portion of the front wall 6 of the case has an aperture 21 therein which preferably is closed by a glass plate or lens 22 to exclude dust from the case, the lens or plate as now contemplated being colorless. Vertical guides 23 are provided on the inner side of the wall 6 adjacent to the aperture 21 and guide shutter 24 which is movable vertically and normally closes the aperture, being held in place by means of a controlling rod 25 fixed thereto and extending through the slot 26 in the bottom 5, the controlling rod having a spring-latch 27 resting upon the bottom 5 but designed to be moved sidewise and drawn through the slot by means of a projecting handle 28 on the end of the controlling rod, to lower the shutter and open the aperture 21 to permit light from the lamp to pass through the aperture.

The rear wall or side 9 of the case has an opening 29 therein in proximity to the bottom of the case and preferably has a dust-excluding transparent plate 30 mounted in a frame 31 secured to the wall, the plate preferably being colorless glass. A suitable frame 32 is arranged vertically in the case a suitable distance inward from the wall 9 and supported by means of brackets 33, 33' secured to the sides 7 and 8, the frame supporting a transparent signal plate 34 opposite to the opening 29, the plate as at present contemplated being composed of red glass through which at night the rays from the lamp pass rearward as a "tail light" at present required on vehicles.

A stop signal is suitably movable in the case so as to be brought to the front of the signal plate 34, being preferably carried by a pivoted frame, and to this end a pair of aligning pivots 35 and 36 are supported on the inner sides of the side walls 7 and 8 respectively and adjacent to the front wall 6, and they support frame arms 37 and 38 respectively that are fixed to a pivot rod 39 which carries the stop signal device consisting preferably of a web or panel 40 composed of fine wire gauze secured to metallic straps or frame members 41 and 42 that loosely hang on the pivot rod 39. The brackets 33 and 33' have guide bars 43 and 43' thereon respectively, each guide bar having a vertical slot 44 therein into which extends a bottom guide rod 45 that is secured to the web and the straps. The web permits the passage of light from the lamp 14 and if desired may be otherwise constituted so as to be transparent to permit the red light signal to be seen through it. The web has a word sign 46, such as "Stop" fixed thereon, the letters of the word being of such substance as to prevent the light rays from passing through them, and permitting the word to be plainly visible in day time with the red signal 34 as a background. The pivoted frame is suitably held up by means of a spring 47 co-operating with one of the frame arms and its pivot, the upward movement being limited by the guide rod 45 at the tops of the slots 44. The frame is pulled downward by a suitable pull rod or cord, an elastic arm 48 preferably being connected to one of the frame arms and to which a flexible rod or wire 49 is connected that extends through a guide tube 50 which is connected with the bottom 5 of the case and extends to a suitable point. A thicker rod 51 may be extended from the rod or wire and suitably connected with the foot lever 4, in some cases being directly connected to a lever 52 pivoted to the frame bar 2 or comprising a part of the service brake rigging, a connecting rod 53 being connected to the lever and to the foot lever 4. Depending upon the various details of structure of various automobiles and the arrangement of attachments, the pull rod 49 may be variously connected with the foot lever 4 so as to be automatically operated when the foot lever is operated. Preferably the pull rod 49 is assisted in its reverse movement by means of a suitably arranged spring 54, either applied or present in the brake rigging.

In practical use the number plate 18 is plainly displayed in day time and is illuminated at night through the window in the bottom of the case. When the motor vehicle has been stopped or "parked" the operator manually pulls down on the handle 28 after unlatching the rod 25, thus opening the aperture 21 so that those ahead understand the position of the vehicle, especially when no head-lights are present. When the vehicle is in motion, the stop signal is withdrawn, but upon each application of the service brakes by pushing the foot lever 4 forward as customary, the stop signal is brought into display position, damage to the mountings thereof being prevented by the elastic arm 48 in case the pull connections are not accurately of the proper length. At night time the stop signal is plainly seen as is also the red tail light through the web or transparent plate 40. Upon release of the brakes, the stop signal is automatically withdrawn from the display position at the opening 29, the red light still being displayed. When about to start the vehicle the shutter is shifted so as to close the aperture 21.

Having thus described the invention, what is claimed as new is,—

1. A motor-vehicle signal apparatus including an inclosing case having two permanent externally-visible signals on opposite sides thereof, a shutter for one of the signals movably supported by the case, and a word signal device movably supported by the case to co-operate with the remaining one of the permanent signals and provided with means to operate the device.

2. A motor-vehicle signal apparatus including an inclosing case having an opening in the wall thereof, a colored signal plate stationarily supported in the case opposite to and spaced apart from the opening, a word signal panel comprising a transparent plate and an opaque word on the plate, and a frame movably supporting the signal panel and guided by the case to carry the panel to or from a position opposite to the front of the colored signal plate.

3. A motor-vehicle signal apparatus including an inclosing case having an opening in the rearward side thereof, a signal plate stationarily supported in the case opposite to and spaced apart from the opening, a frame pivotally supported in the case and having a laterally elastic operating-arm, a word signal panel connected to the pivoted frame and movable thereby to a position between the opening and the signal plate, and a laterally elastic rod extending through the bottom of the case and connected to the operating-arm.

4. In a motor-vehicle signal apparatus, the combination of an inclosing case comprising a bottom having a window therein, a front wall having an aperture therein, side walls, a top, and a rear wall having an opening therein; a standard secured to said bottom, a lamp socket upon said standard, a lamp supported by said socket above said bottom, a separate cross-bar fixed on said standard to support a plate lower than said window, a shutter movably supported on said front wall to close said aperture, a colored signal plate stationarily supported by said side walls opposite to and spaced apart from said opening, a frame pivotally supported by said side walls, a stop signal panel pivotally supported by said frame to be carried to or from a position between said opening and said signal plate, a guide tube connected to said bottom, and a laterally elastic pull-rod extending through said tube and having connection with said pivotally supported frame.

In testimony whereof, I affix my signature in presence of two witnesses.

WILLIAM HUBERT SAWYER.

Witnesses:
 JOHN BRAY,
 EVERETT WARMOTH.